United States Patent
Tanzy (10) Patent No.: US 7,747,628 B2
(45) Date of Patent: Jun. 29, 2010

(54) SYSTEM AND METHOD FOR AUTOMATED CONSTRUCTION, RETRIEVAL AND DISPLAY OF MULTIPLE LEVEL VISUAL INDEXES

(75) Inventor: Henry W. Tanzy, Atlanta, GA (US)

(73) Assignee: Computer Associates Think, Inc., Islandia, NY (US)

( * ) Notice: Subject to any disclaimer, the term of this patent is extended or adjusted under 35 U.S.C. 154(b) by 288 days.

(21) Appl. No.: 11/399,011

(22) Filed: Apr. 5, 2006

(65) Prior Publication Data

US 2007/0239739 A1 Oct. 11, 2007

(51) Int. Cl.
*G06F 7/00* (2006.01)
(52) U.S. Cl. .................. 707/741; 707/705; 707/736; 707/746
(58) Field of Classification Search .................. 707/1, 707/2, 3, 4, 10, 100, 999.001, 999.002, 999.003; 715/712, 713
See application file for complete search history.

(56) References Cited

U.S. PATENT DOCUMENTS

| | | | | |
|---|---|---|---|---|
| 5,848,410 | A * | 12/1998 | Walls et al. | 707/4 |
| 6,578,038 | B1 * | 6/2003 | Haegele | 707/100 |
| 6,757,673 | B2 * | 6/2004 | Makus et al. | 707/3 |
| 7,412,444 | B2 * | 8/2008 | Gaponoff | 707/7 |
| 2003/0101171 | A1 * | 5/2003 | Miyamoto et al. | 707/3 |
| 2007/0005557 | A1 * | 1/2007 | Robertson et al. | 707/1 |

OTHER PUBLICATIONS

Pending U.S. Appl. No. 11/399,113, entitled "*System and Method for Managing Virtual Tree Pages*", by Henry W. Tanzy, 20 pages including 9 pages of drawings, filed Apr. 5, 2006.

* cited by examiner

*Primary Examiner*—Hung Q Pham
(74) *Attorney, Agent, or Firm*—Baker Botts L.L.P.

(57) ABSTRACT

A method for displaying a multiple level visual index representing data records, comprises storing a plurality of data records and receiving a request to access the stored data records. The method continues by using index parameters to generate a multiple level visual index for the stored data records to be accessed. The method concludes by transmitting a graphical representation of the generated multiple level visual index.

16 Claims, 9 Drawing Sheets

```
Visual Index File                           300
302  <?xml version="1.0" ?>
     -<root>       304
       +<idx x="0" d="0">              aa    ...abiders|
       +<idx x="15" d="196">           abides ...abridgement
       +<idx x="30" d="392">           abridgements ...absurdity
       +<idx x="45" d="588">           absurdly ...accessorized
       +<idx x="60" d="784">           accessorizes ...accusal
       +<idx x="75" d="980">           accusant ...acidimetry
306    +<idx x="90" d="1176">          acidities ...acrostical
       +<idx x="105" d="1372">         acrostically ...adaptor
       +<idx x="120" d="1568">         adaptors ...adjuncts
       +<idx x="135" d="1764">         adjuration ...adrenocorticotropic
       +<idx x="150" d="1960">    322  adrenocorticotrophin ...advisers
       +<idx x="165" d="2156">         advises ..aestivation
       -<idx x="180" d="2352">  314    aether ...atterclaps
         312    <idx x="181" d="2352">aether ...affable</idx>
320      <idx x="182" d="2366">affably ...affectedness</idx>
         <idx x="183" d="2380">affectednesses ...affective</idx>  324
         310                                                       LEAF
         <idx x="194" d="2534">afreets ...afterclaps</idx>         NODES-
308    </idx>                                                      NO
       +<idx x="195" d="2548"> afterdeck ...aggravations*Last*     CHILDREN
     </root>
```

```
350  Data File 1 of 6
     <?xml version="1.0" ?>
     -<root>    356    358
352    <dat id="0">aa</dat>
       <dat id="1">aah</dat>
       <dat id="2">aahed</dat>
       <dat id="3">aahing</dat>
       <dat id="4">aahs</dat>
       <dat id="5">aal</dat>
       <dat id="6">aalil</dat>
354    <dat id="7">aaliis</dat>
       ----------------------------
       <dat id="495">absorbance</dat>
       <dat id="496">absorbances</dat>
       <dat id="497">absorbancies</dat>
       <dat id="498">absorbancy</dat>
       <dat id="499">absorbant</dat>
     </root>
```

```
370  Data File 4 of 6
     -<root>
       <dat id="2000">adulatory</dat>
       <dat id="2001">adult</dat>
       <dat id="2002">adulterant</dat>
       ----------------------------
374    <dat id="2351">aestivations</dat>
       <dat id="2352">aether</dat>
       <dat id="2353">aetheric</dat>
       <dat id="2354">aethers</dat>
       <dat id="2355">aetiologies</dat>
       <dat id="2356">aetiology</dat>
372    <dat id="2357">afar</dat>
       <dat id="2358">afars</dat>
       <dat id="2359">afeard</dat>
       <dat id="2360">afeared</dat>
       <dat id="2361">affable</dat>
       <dat id="2362">affably</dat>
     </root>       affectation</dat>
```

```
Visual Index File "idx" Hierarchy
        <?xml version="1.0" ?>
       -<root>
         +<idx x="0" d="0">           aa      ...abiders|
         +<idx x="15" d="196">        abides ...abridgement
         +<idx x="30" d="392">        abridgements ...absurdity
         +<idx x="45" d="588">        absurdly ...accessorized
LEVEL 1  +<idx x="60" d="784">        accessorizes ...accusal
INDICES  +<idx x="75" d="980">        accusant ...acidimetry
  405    +<idx x="90" d="1176">       acidities ...acrostical
         +<idx x="105" d="1372">      acrostically ...adaptor
         +<idx x="120" d="1568">      adaptors ...adjuncts
         +<idx x="135" d="1764">      adjuration ...adrenocorticotropic
         +<idx x="150" d="1960">      adrenocorticotrophin ...advisers
         +<idx x="165" d="2156">      advises ..aestivation
         -<idx x="180" d="2352">      aether ...atterclaps
              <idx x="181" d="2352">aether ...affable</idx>
              <idx x="182" d="2366">affably ...affectedness</idx>
              <idx x="183" d="2380">affectednesses ...affective</idx>
              <idx x="184" d="2394">affectively ...affianced</idx>
LEVEL 2       <idx x="185" d="2408">affiances ...affiliating</idx>
INDICES       <idx x="186" d="2422">affiliation ...affirmation</idx>
  415         <idx x="187" d="2436">affirmations ...affixations</idx>
              <idx x="188" d="2450">affixed ...affliction</idx>
              <idx x="189" d="2464">afflictions ...afford</idx>
              <idx x="190" d="2478">affordabilities ...affray</idx>
              <idx x="191" d="2492">affrayed ...affront</idx>
              <idx x="192" d="2506">affronted ...afield</idx>
              <idx x="193" d="2520">afire ...afreet</idx>
LEVEL 1       <idx x="194" d="2534">afreets ...afterclaps</idx>
 INDEX    </idx>
  410    +<idx x="195" d="2548"> afterdeck ...aggravations*Last*
       -</root>
```

FIG. 8
RELATIONSHIP BETWEEN INDEX AND DATA FILE AND A GRAPHICAL USER INTERFACE

FIG. 9

SYSTEM AND METHOD FOR AUTOMATED CONSTRUCTION, RETRIEVAL AND DISPLAY OF MULTIPLE LEVEL VISUAL INDEXES

TECHNICAL FIELD OF THE INVENTION

The present invention relates generally to the field of data processing, particularly to a system and method for the automatic construction, retrieval, and display of multiple level visual indexes representing keyed data located in a database.

BACKGROUND OF THE INVENTION

Conventional database management systems use indexing to facilitate user access to keyed data. Keys may be unique to particular files or records (social security number, vehicle identification number ("VIN"), etc.) or non unique (dates, student grades, etc.), and may have significance solely to the intended user of the application (e.g., a VIN to a car salesman using a dealership inventory application).

In large databases, a user query may cause thousands of keyed data records to be returned, slowing access to the desired data while the user filters and scrolls through the list of returned data. Furthermore, in network-based applications, rendering large amounts of data on the client computer is impractical and the increased network traffic and server usage greatly reduces system efficiency. Applying the search/filter/results methods used in Internet search engines, in which the user executes filter queries and accesses a virtual number of results pages one page at a time, requires, for a large result set, the examination of hundreds of pages before the desired record or file is located. Existing single level indexes are of extremely limited use for subdividing large amounts of data to allow for efficient location of desired data. For example, Sun's single-level Java Help Facility, which has separate indexes for the letters "A" thru "Z", generates 3100 entries when the letter "A" is clicked.

SUMMARY OF THE INVENTION

In view of the problems and shortcomings associated with user interfaces for the retrieval, display, and interaction with very large result sets, the invention herein disclosed provides an efficient, user-friendly system and method for displaying keyed data using multiple level visual indexes. In one embodiment, a visual index facility creates index files for sorted data records on a database using pre-established index parameters. In another embodiment, the visual index facility creates index files using dynamically generated index parameters, depending on the size of the result set and the number of records/indexes that can be displayed on the user interface at one time. In yet another embodiment, the user interface is a client computer and the database is located on a server. In still another embodiment, the client is a computer running a web browser and the database is located on a server.

Other features and advantages of the present invention will be apparent from the following description and the accompanying drawings.

BRIEF DESCRIPTION OF THE DRAWINGS

For a more complete understanding of the present invention and its advantages, reference is now made to the following description, taken in conjunction with the accompanying drawings, in which:

FIG. 4 illustrates one embodiment of a format of index and data files;

FIG. 5 illustrates one embodiment of an index file "idx" hierarchy;

DETAILED DESCRIPTION OF EXAMPLE EMBODIMENTS OF THE INVENTION

Figure 1:
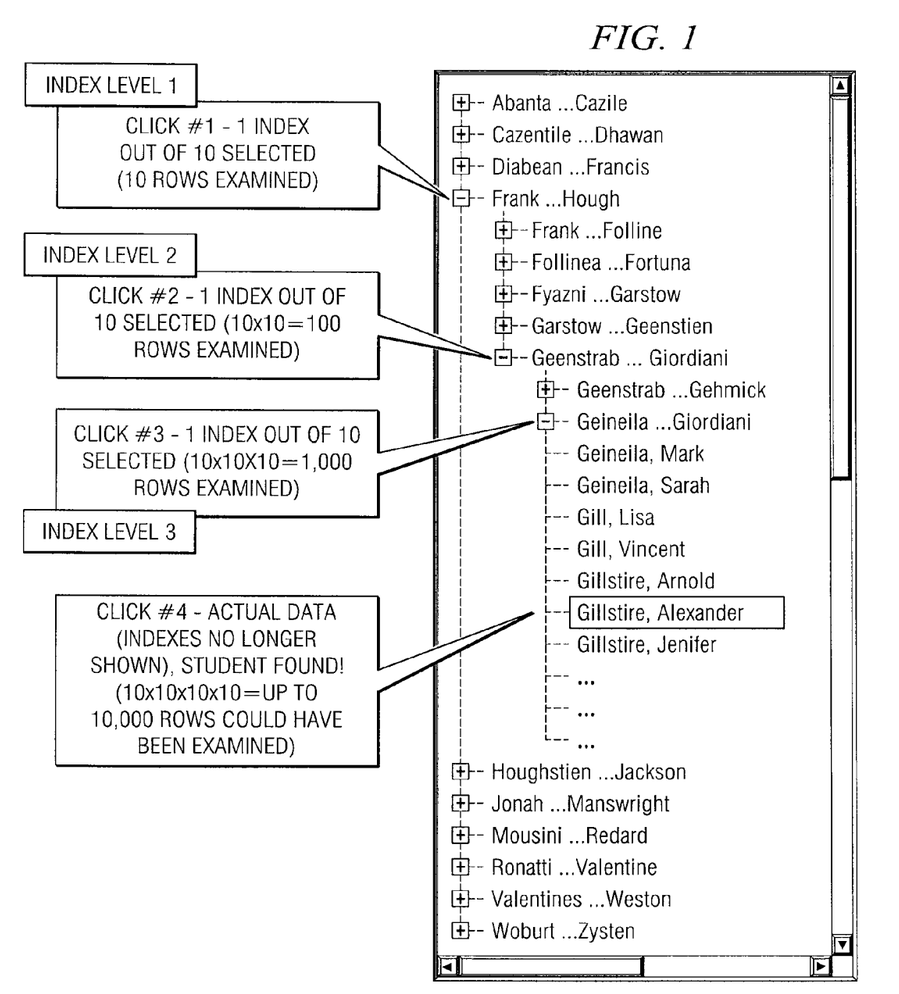
FIG. 1 illustrates one embodiment of a user interface of a visual index facility according to one embodiment of the present invention.

FIG. 1 illustrates one embodiment of the appearance of a user interface for implementing an embodiment of the present invention in which a university administrator has located the records for a student named "Alex Giltshire" from among approximately 10,000 students in the university. In this example, the administrator did not know the exact spelling of the student's name, but was nevertheless able to rapidly locate the desired record. The administrator was first shown an alphabetized index listing of ten groups of approximately 1000 students each, "Abanta . . . Cazile," etc. (index level 1), from which the administrator selected the group "Frank . . . Hough," exposing a second alphabetized index listing of ten groups of approximately 100 students each, "Frank . . . Foline," etc. (index level 2), from which the administrator selected the group "Geenstrab . . . Giordani," exposing a third alphabetized index listing of ten groups of approximately 10 students each, "Geenstrab . . . Gehlnick," etc. (index level 3), from which the administrator selected "Geinienla . . . Giordiani," exposing an alphabetical list of data records for ten individual students, including the desired record for "Giltshire, Alexander."

Even data sets larger than the 10,000 students of the above example—which uses a three-level index of depth 10—may be rapidly navigated using appropriately constructed multiple level visual indexes, where the user may execute only one click more than the number of index levels to reach the required data. For example, a two-level index of depth 28 can index 21,952 data items, a three-level index of depth 12 can index 20,736 data items, a three-level index of depth 30 can index 810,000 data items, and a three-level index of depth 40 can index 2,560,000 data items. As explained in detail below, the index generation parameters—which include (1) the number of index levels to be generated; (2) the depth of each index level; and (3) the maximum number of data entries for each data file generated—may be supplied by the user or generated dynamically by the visual index facility based on the number of data records to be accessed and the number of records that can be displayed on the client's screen, and optimized so that the user does not have to scroll through lists of data or indexes.

Implementation of the visual index facility provides that the data to be accessed contains a unique key field and that this key field has meaning to the user of the application. Non-unique key fields, such as date and student grades, are not amenable to the creation of visual indexes, whereas unique key fields that have meaning solely to the user of the application, e.g., the car salesman accessing inventory via VIN number, are amenable to implementation of visual indexes.

In one embodiment, the visual index facility may be implemented in a client browser/server configuration with a data file generated from the index file in a markup language such as Extensible Markup Language ("XML"). An application programming interface ("API") may then be applied to read the data from the data file of returned data. The API may be the Simple API for XML (or "SAX") parser that handles XML data as a single, continuous stream of data and does not require the entire XML file to be stored in memory. The visual index is displayed to the user of the client computer using hypertext markup language ("HTML") transmitted from the server.

Figure 2:
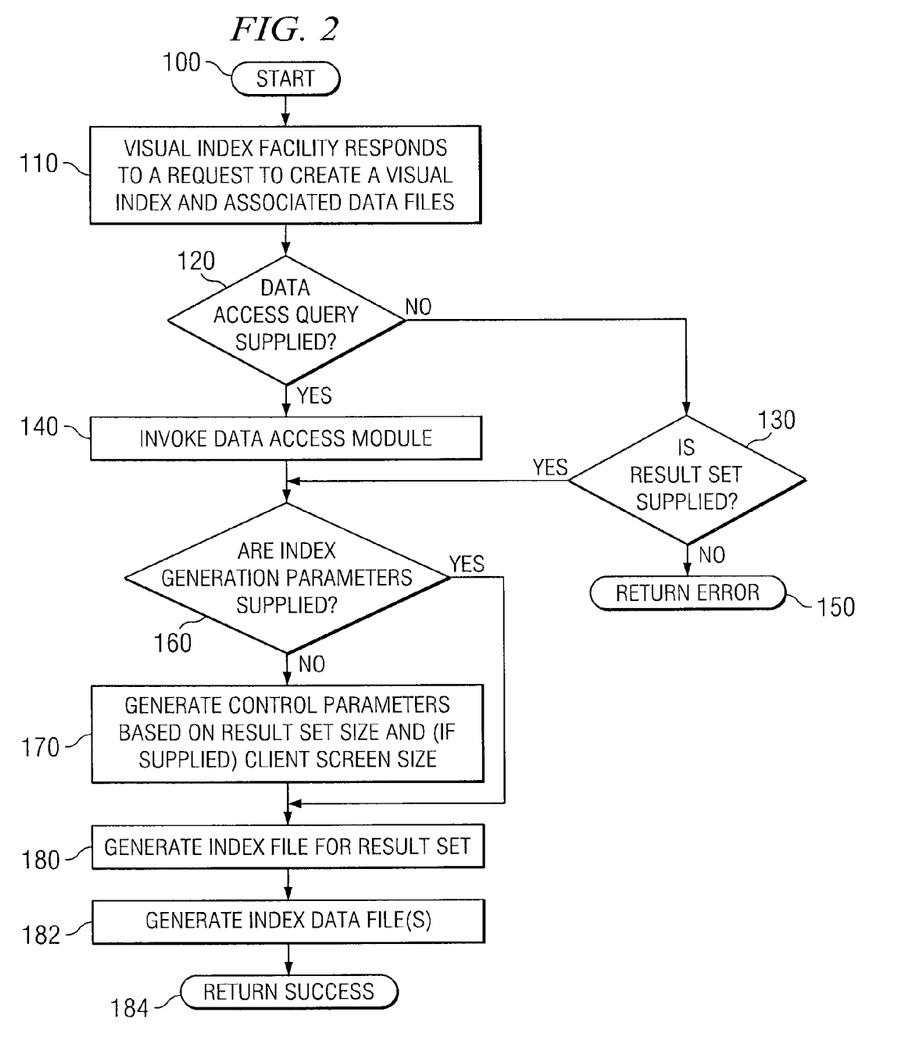
FIG. 2 illustrates one embodiment of a flow diagram for implementing a create index operation.

FIG. 2 illustrates one embodiment of a flow diagram for implementing a method for creating a visual index and associated data files in response to a client request. The method starts at 100 with the visual index facility responding to a request to create a visual index and associated data files 110. At block 120, a determination is made whether a data access query (i.e., a query for creating a sorted result set from the database contents) has been supplied. If such a query has been supplied, at block 140, the data access module is invoked and an industry standard access method/protocol is used to create a sorted result set. Examples of such standard access methods/protocols include the Java Database Connectivity ("JDBC") and the Simple Object Access Protocol ("SOAP"), though other access methods may be employed.

If it is determined, at block 120, that no data access query was supplied, then a determination is made, at block 130, whether or not a sorted result set has separately been supplied. (The user may have run their own access routines to create a sorted result set.) If no such result set was supplied, then the method returns an error condition at block 150.

Once it has been determined that a sorted result set is available—either supplied by the user 130 or generated by the data access module 140—a further determination is made, at block 160, whether index generation parameters have been supplied by the user. If no index generation parameters have been supplied, at block 170, they are generated based on the size of the result set and, if known, the client's screen size. In one embodiment, the parameter generation algorithm is biased to produce depths corresponding to approximately two thirds of the client's screen size, minimizing the need for the user to scroll when selecting indexes for expansion.

Once control parameters (index generation parameters) have been established, at block 180, a routine is called to generate the index file based on the current result set size. Next, at block 182, a routine is called to generate the data file(s) associated with the index file. The format and relationship between the index file and data file(s) is described in more detail below with reference to FIG. 4. Finally, at block 184, the method returns a "success" status.

Figure 3:
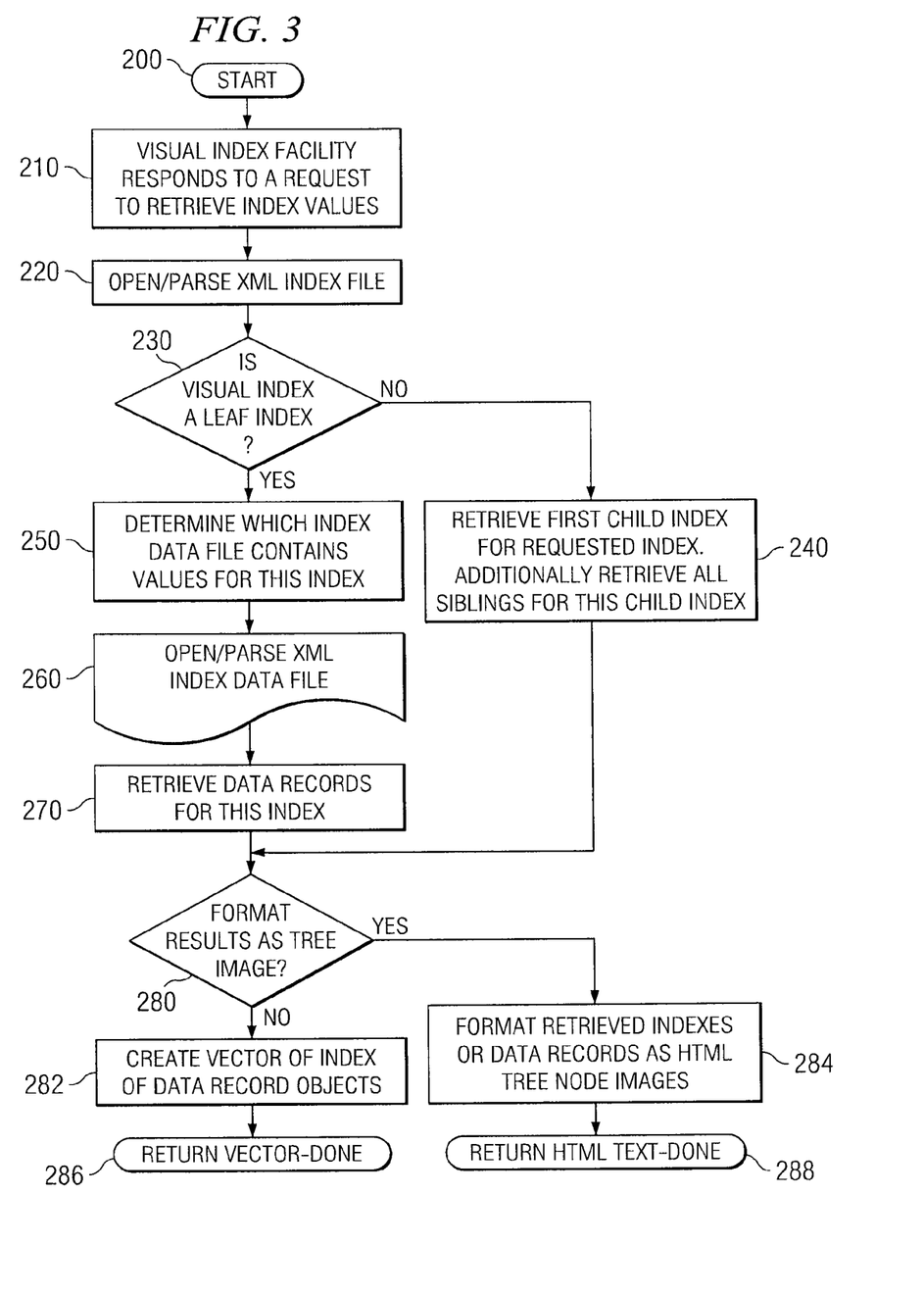
FIG. 3 illustrates one embodiment of a flow diagram for implementing an index retrieval operation.

FIG. 3 illustrates one embodiment of a flow diagram for implementing a method for retrieving the visual index or data values associated with a given target index. The method commences at block 200. At block 210, the visual index facility responds to a request to produce index values and, at block 220, the index file is opened and parsed using, for example, a SAX parser. At block 230, a determination is made as to whether the target index requested is a leaf index. A leaf index is defined as an index that does not point to another index but instead points directly to a data file. If it is determined that the target index is not a leaf index, at block 240 the first child of the target index is retrieved from the index file together with all the siblings for that child. On the other hand, if it is determined that the target index is in fact a leaf index then, at block 250, the data file to which the index points is determined. That data file is then opened and parsed, using the SAX parser, and all data records associated with the target index retrieved, at blocks 260 and 270, respectively.

Once block 240, the retrieval of the child index and all its siblings, or block 270, the retrieval of the data records for a leaf index, have been invoked, at block 280, a determination is made whether or not to format the results as a simple vector of text strings or as HTML formatted for output as images within a graphical tree diagram. According to the result of this determination, the index or data records may be used to create a vector of text records, at block 282, and the formatted vector returned at block 286, or the index or data records may be formatted for output as HTML text with image bitmaps describing the graphical tree, at block 284, and HTML text returned at block 288.

FIG. 4 illustrates one embodiment of a visual index file 300 and data files 350 and 370 written in XML. The visual index file 300 contains two element types: a "root" 302 and an "idx" 304 element, with one "root" element 302 defined for an index file and 1 to N child ("idx") elements. The "idx" elements, that are children of the "root" element, are first level indexes, 306 and 308. In turn, each "idx" element may be the parent of further "idx" elements, grandchildren that are second level indexes 320. In turn, if these grandchildren have child "idx" elements, they will comprise third level indexes. Though, in principle, this scheme may continue indefinitely, as noted above, two and three level indexes are sufficient for answer sets up to millions of records. An "idx" element without a child element is termed a leaf index 324. While a non leaf index 310 will point to a range of indexes within the index file, a leaf index 322 will point to a range of "dat" elements 372 located in one or more data files 370.

As shown in FIG. 4, an "idx" element has two attributes. The "x" attribute 312 identifies the index and may be used by a client program to request retrieval of the children of a specific index. The "d" attribute 314 identifies where the data for the current index range is stored in data file 370. In this example, the value of the "d" attribute, "2352" will map 372 directly to the "id" attribute, "2352" 374 corresponding to the data file's "dat" elements. The "idx" element 322 contains a text string, "aether . . . affable," that represents the range of "idx" elements (in a non leaf node) or data file "dat:" elements (in a leaf node) associated with this index.

The visual index file 300 provides a hierarchy of visual indexes having pointers to one or more of data files 350 and 370. The elements "d" of index file "idx" points to a range of data file "dat" elements 372. The XML representation of data file 370 contains a single root element 352 containing 1 to N child "dat" elements 354. These "dat" elements do not have children. Each "dat" element will have an "id" attribute 356. The "id" attribute corresponds to the index file's "idx" elements "d" attribute. The content stored in the "dat" element 358 is application dependent.

A single visual index file 300 may have a maximum number of data entries, as defined by the index generation parameters, as shown in FIG. 2 at block 160. For example, if the maximum data file size is defined as 500, with 2548 data elements requiring indexing, there will be a total of 6 data files.

FIG. 5 further illustrates the relationship of the "idx" elements within visual index file 400 showing how multiple level indexes are stored in the visual index facility. All children of the root elements, 405 and 410, identify first level indexes. All children, 415, of a specific "idx" element, identified by the "x" attribute "180", are second level visual indexes that may be retrieved by the user clicking on that first level index.

Figure 6:
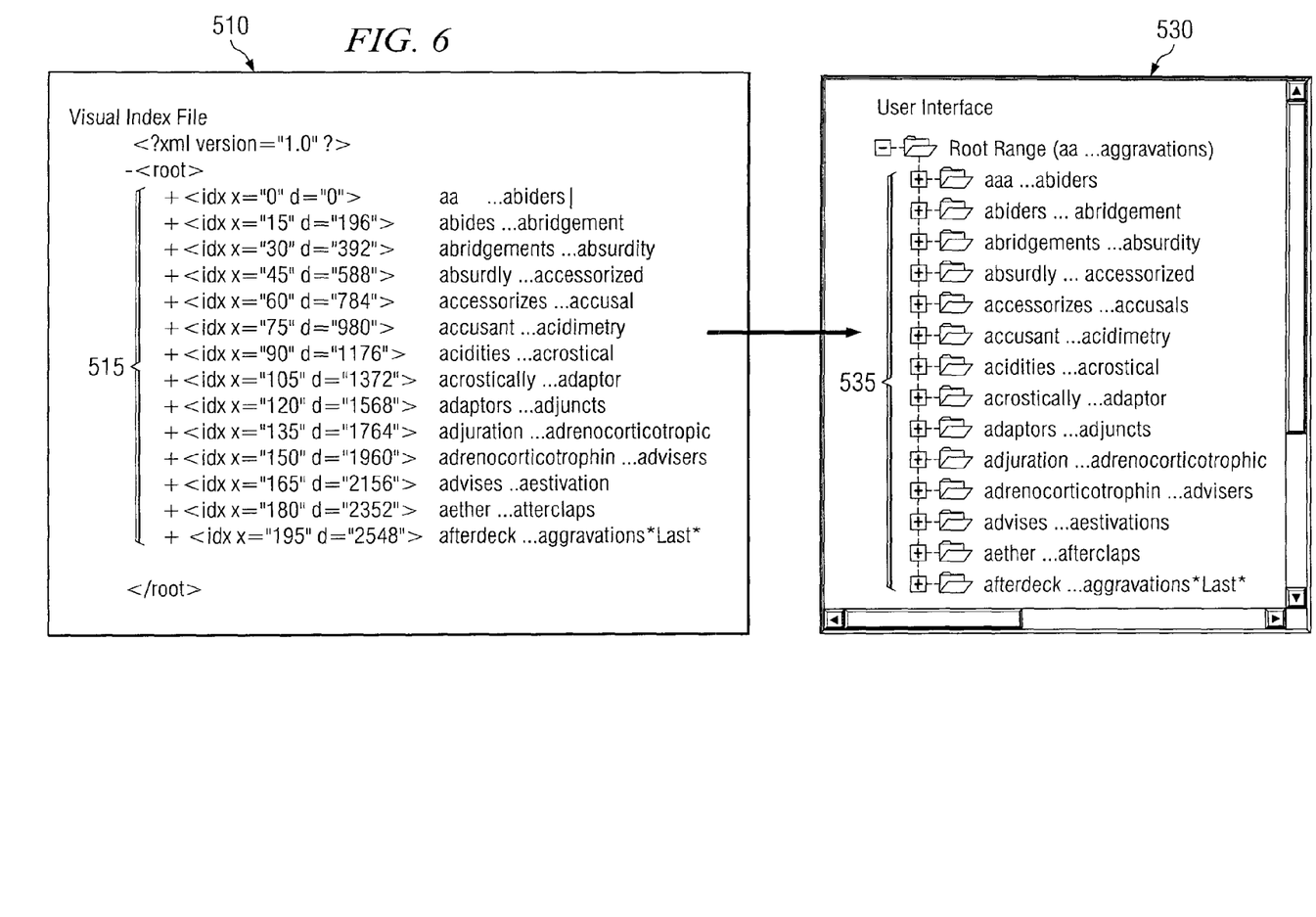
FIG. 6 illustrates one embodiment of the relationship between the index file and an example graphical user interface.

FIG. 6 illustrates the relationship between the visual index file 510 in the visual index facility and the image displayed on a graphical user interface 530. The user may request the visual index facility to return all first level indexes. By returning all the direct children of the first level visual index 515, second level visual indexes 535 are displayed.

Figure 7:
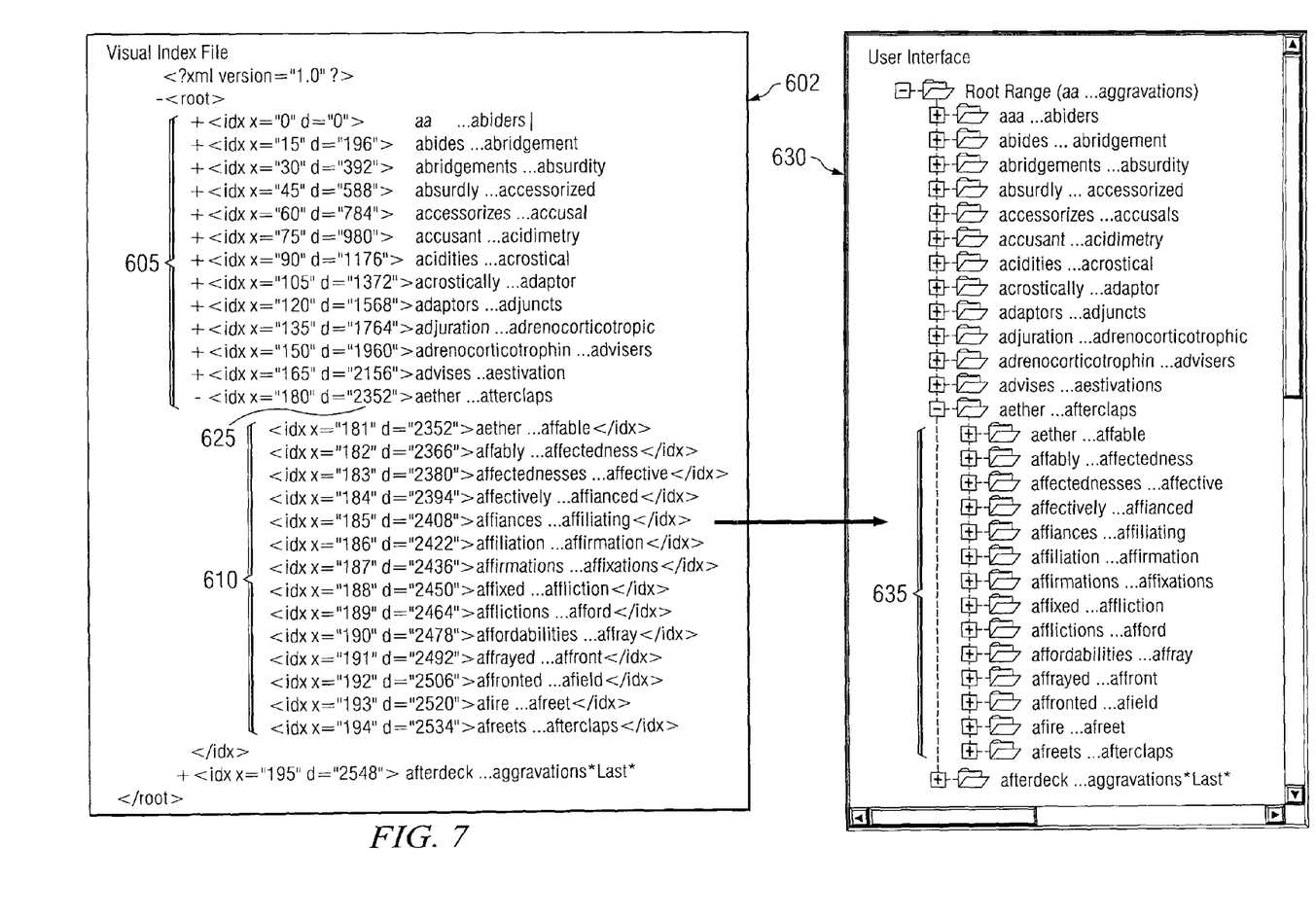
FIG. 7 illustrates one embodiment of the relationship between the index file, second level indexes, and a graphical user interface.

FIG. 7 further illustrates the relationship between visual index file 602 (second level indexes) and a graphical user interface 630. In this example, after a request to display all the indexes for the "aether . . . afterclaps" node, the visual index facility navigates the visual index file 602 and returns all child nodes for the "idx" element with "x" attribute "180" 625. The child "idx" nodes are shown as XML elements 610, with their corresponding graphical representation 635.

Figure 8:
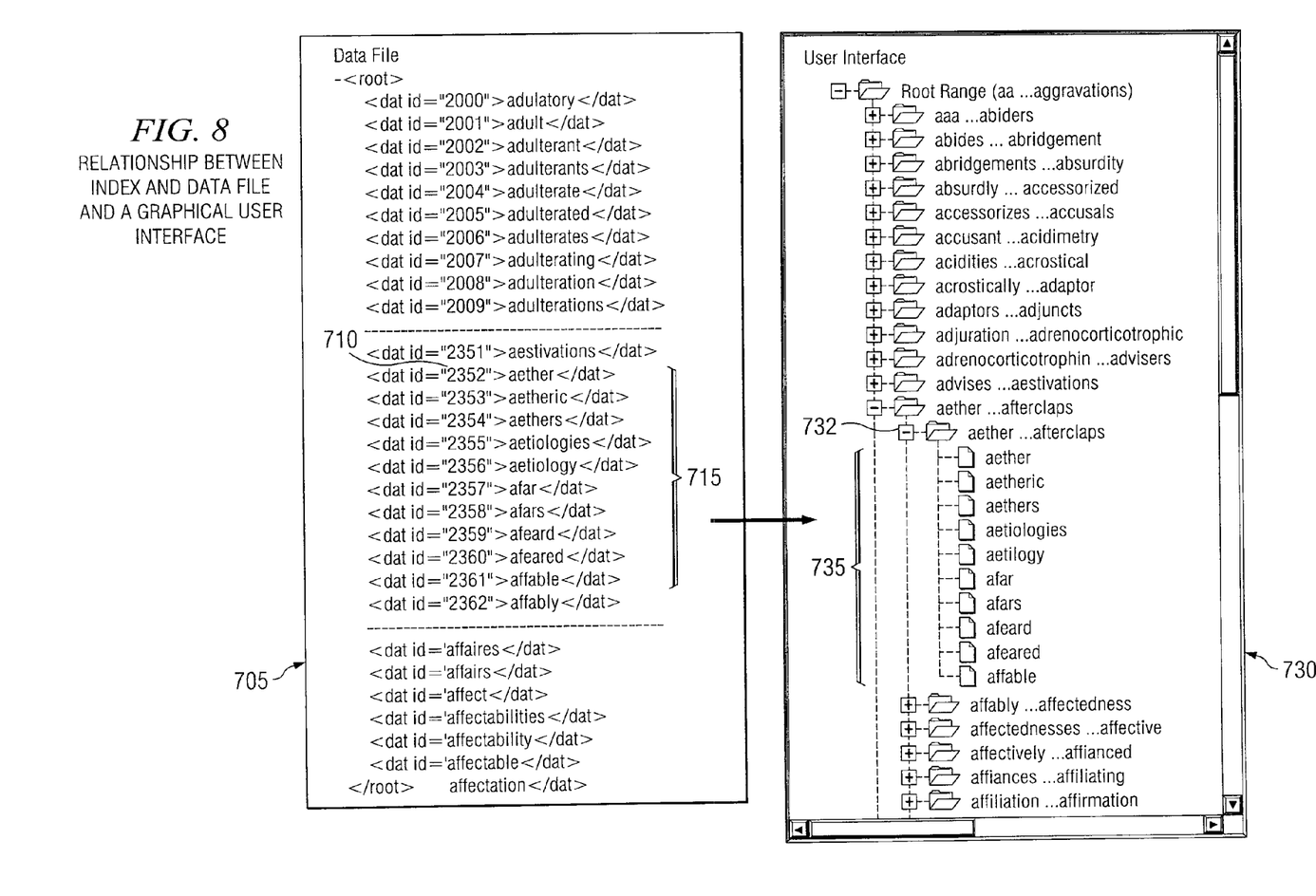
FIG. 8 illustrates one embodiment of the relationship between the index file, data file(s), and a graphical user interface.

FIG. 8 illustrates a request to return the children of a leaf node from the visual index file. The graphical user interface 730 receives a request from the user to expand the "aether . . . affable" index entry 732 and a request is made to the visual index facility to return all children with attribute x="181". The visual index facility first looks in the index file (Shown in FIG. 7 for element x="181"). Since this element is a "leaf" element, the visual index facility uses the "d" attribute to identify the location of the data in the data file 705 and the "dat" element with attribute "2352" is located 710. All "dat" elements that fall in the range of the "idx" element x="181" range are retrieved 715 and are displayed in the graphical user interface 730 at block 735.

Figure 9:
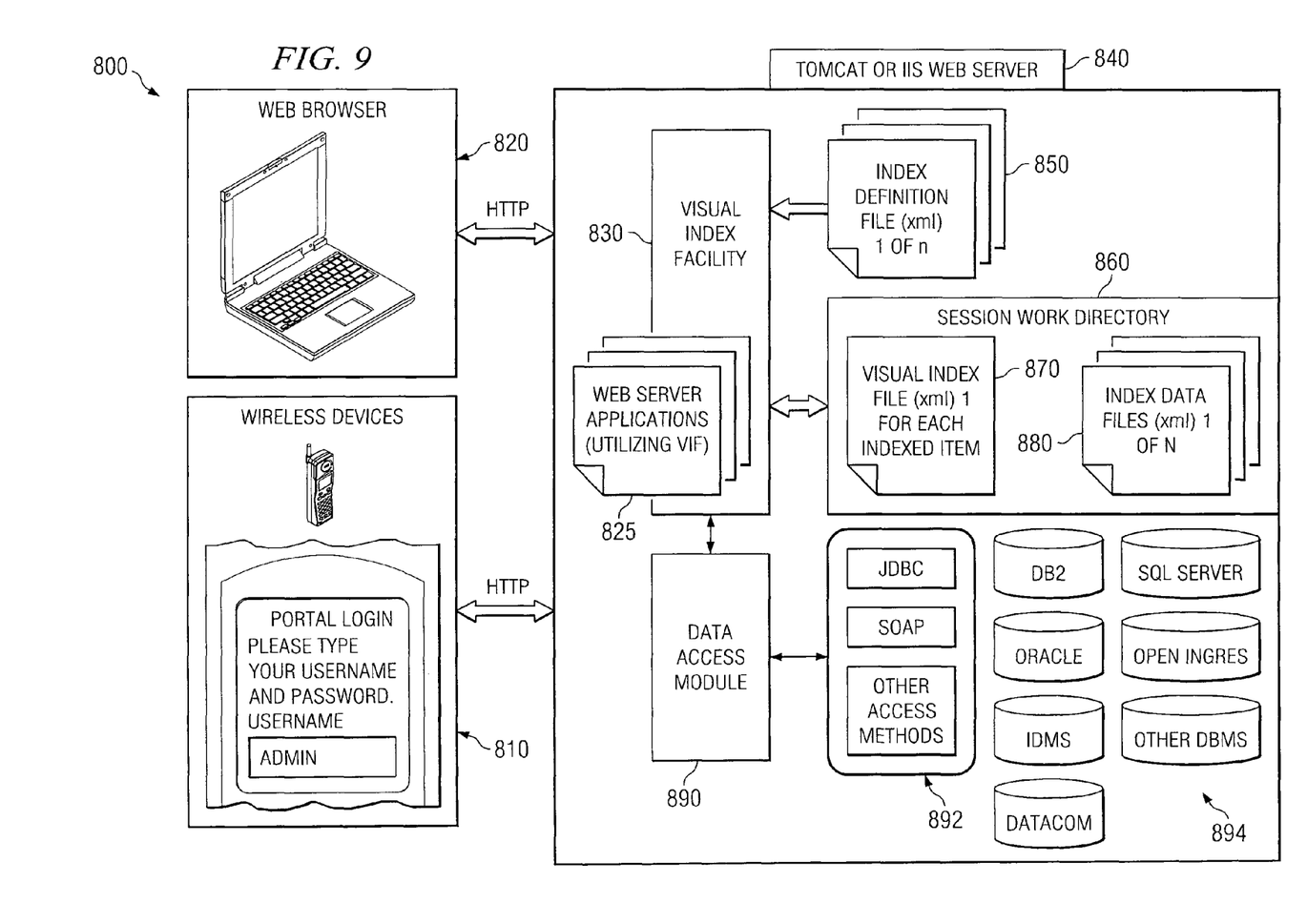
FIG. 9 is a schematic showing the relationship between the visual index facility architecture and other data processing applications.

FIG. 9 is a schematic architecture for implementing a preferred embodiment of the visual index facility on a Web server having a processor and memory for executing the various modules and associated functionality described herein. Although this embodiment is illustrated with a Tomcat or IIS Web Server 840, the present disclosure contemplate using other Web server types. Moreover, although this embodiment is illustrated using particular modules, the present disclosure contemplates any suitable number and combination of modules to perform the functionality described herein.

A user of either a client personal computer 820 or wireless device 810 sends a request in HTTP format to a Web server application 825 that utilizes the visual index facility 830 for the creation and display of specified visual indexes. A session work directory 860 of the visual index facility 830 stores a visual index file 870 (e.g., such as the visual index files 300, 400, 510, and 602 described with respect to prior figures), and the associated index data files 880 (e.g., such as the data files 350, 370, and 705 described with respect to prior figures). As discussed above, in one embodiment, using data access module 890, the visual index facility 830 may be interfaced with data access protocols shown at 892 for accessing enterprise data stored using one or more of the applications shown at 894. The application-specific index definition file 850 contains parameters defining the indexes and information about the query to be executed by data access module 890, such as which data access protocol 892 to use, JDBC, SOAP, etc. Access protocol 892 executes the query on a remote or local database management system. Examples of common databases, DB2, Oracle, IDMS, Datacom, etc., are shown in block 894. As discussed above, the data access module 890 returns the result to the virtual index facility 830, which constructs and manages the visual indexes to be stored in the server and delivered to the user in response to the user's initial request.

Those of ordinary skill in the art will appreciate that the foregoing discussion of certain embodiments and preferred embodiments is illustrative only, and does not limit the spirit and scope of the present invention, which are limited only by the claims as set forth below.

What is claimed is:

1. A method for displaying a multiple level visual index representing data records, the method comprising:
   storing a plurality of data records in a memory;
   receiving, by a processor with access to the memory, a request to access the plurality of stored data records;
   using the processor to generate a multiple level visual index for the plurality of stored data records to be accessed based on a plurality of index parameters, the plurality of index parameters comprising a number of the plurality of stored data records to be accessed, the number of index levels to be generated, and the depth of each index level; and
   transmitting a graphical representation of the generated multiple level visual index for display on a graphical user interface, the graphical representation comprising a plurality of index levels concurrently displayed as an expandable graphical tree diagram, and
   wherein the plurality of index parameters are supplied by a user making the request.

2. The method of claim 1, wherein the request is received from a client and the method is executed on a server remote from the client.

3. The method of claim 2, wherein the client is further configured to execute a web browser application.

4. The method of claim 1, wherein generating a multiple level visual index comprises:
   generating an index file based at least in part on a number of the plurality of data records to be accessed;
   generating a plurality of data files associated with the index file; parsing the index file to identify at least one target index;
   if the target index is a leaf index, then identifying a data file associated with the leaf index and retrieving a plurality of associated data records;
   if the target index is not a leaf index, then retrieving at least one child index and at least one sibling index associated with the child index; and
   formatting the retrieved child and sibling indexes or the retrieved data records as tree node images.

5. A method for displaying a multiple level visual index representing data records, the method comprising:
   storing a plurality of data records in a memory;
   receiving, by a processor with access to the memory, a request to access the plurality of stored data records;
   using the processor to generate a multiple level visual index for the plurality of stored data records to be accessed based on a plurality of index parameters; and
   transmitting a graphical representation of the generated multiple level visual index for display on a graphical user interface, the graphical representation comprising a plurality of index levels concurrently displayed as an expandable graphical tree diagram; and
   wherein the plurality of index parameters are based at least in part on a number of the plurality of stored data records to be accessed and a number of data records that can be viewed at one time without requiring user scrolling, and
   wherein the plurality of index parameters are supplied by a user making the request.

6. The method of claim 5, wherein the request is received from a client having a display associated with a display size, and the number of data records that can be viewed at one time without requiring user scrolling is based at least in part on the display size.

7. A system for developing a multiple level visual index representing data records, comprising:
a memory operable to store a plurality of data records; and
a processor operable to:
receive a request to access the plurality of stored data records; and
generate, using index parameters, a multiple level visual index for the plurality of stored data records to be accessed, the index parameters comprising a number of the plurality of stored data records to be accessed, the number of index levels to be generated, and the depth of each index level; and
transmit a graphical representation of the generated multiple level visual index, the graphical representation comprising a plurality of index levels concurrently displayed as an expandable graphical tree diagram, and,
wherein the index parameters are supplied by a user making the request.

8. The system of claim 7, wherein the request is received from a client having a display configured to render the graphical representation of the generated multiple level visual index.

9. The system of claim 8, wherein the display is associated with a display size, and the number of data records that can be viewed at one time without requiring user scrolling is based at least in part on the display size.

10. The system of claim 8, wherein the client is further configured to run a web browser application.

11. The system of claim 7, wherein the processor generates the multiple level visual index by:
generating an index file based at least in part on a number of the plurality of data records to be accessed;
generating a plurality of data files associated with the index file;
parsing the index file to identify at least one target index;
if the target index is a leaf index, then identifying a data file associated with the leaf index and retrieving a plurality of associated data records;
if the target index is not a leaf index, then retrieving at least one child index and at least one sibling index associated with the child index; and
formatting the retrieved child and sibling indexes or the retrieved data records as tree node images.

12. A system for developing a multiple level visual index representing data records, comprising:
a client; and
a server communicatively coupled to the client and operable to:
store a plurality of data records;
receive a request to access the plurality of stored data records from the client;
generate, using index parameters, a multiple level visual index for the plurality of stored data records to be accessed, the index parameters comprising a number of the plurality of stored data records to be accessed, the number of index levels to be generated, the depth of each index level, and a number of data records that can be viewed at one time without requiring user scrolling; and
transmit a graphical representation of the generated multiple level visual index, the graphical representation comprising a plurality of index levels concurrently displayed as an expandable graphical tree diagram; and
wherein the index parameters are supplied by a user of the client making the request, and
wherein the client comprises a display configured to render the graphical representation of the generated multiple level visual index.

13. The system of claim 12, wherein the client supplies the index parameters to the server.

14. The system of claim 12, wherein the server is further operable to dynamically generate the index parameters based on a number of the plurality of data records to be accessed and a number of data records that can be viewed at one time using the display without requiring user scrolling.

15. The system of claim 12, wherein the display is associated with a display size, and the number of data records that can be viewed at one time without requiring user scrolling is based at least in part on the display size.

16. The system of claim 12, wherein the server generates the multiple level visual index by:
generating an index file based at least in part on a number of the plurality of data records to be accessed;
generating a plurality of data files associated with the index file; parsing the index file to identify at least one target index;
if the target index is a leaf index, then identifying a data file associated with the leaf index and retrieving a plurality of associated data records;
if the target index is not a leaf index, then retrieving at least one child index and at least one sibling index associated with the child index; and
formatting the retrieved child and sibling indexes or the retrieved data records as tree node images.

* * * * *